(12) United States Patent
Yoon

(10) Patent No.: US 12,522,210 B2
(45) Date of Patent: Jan. 13, 2026

(54) VEHICLE LANE KEEPING ASSIST METHOD AND DEVICE

(71) Applicant: HL Klemove Corp., Incheon (KR)

(72) Inventor: Taesik Yoon, Incheon (KR)

(73) Assignee: HL Klemove Corp., Incheon (KR)

( * ) Notice: Subject to any disclaimer, the term of this patent is extended or adjusted under 35 U.S.C. 154(b) by 0 days.

(21) Appl. No.: 18/810,736

(22) Filed: Aug. 21, 2024

(65) Prior Publication Data

US 2025/0313197 A1 Oct. 9, 2025

(30) Foreign Application Priority Data

Apr. 3, 2024 (KR) .......................... 10-2024-0045221

(51) Int. Cl.
*B60W 30/12* (2020.01)
*G06V 10/60* (2022.01)
*G06V 20/56* (2022.01)

(52) U.S. Cl.
CPC .............. *B60W 30/12* (2013.01); *G06V 10/60* (2022.01); *G06V 20/588* (2022.01); *B60W 2420/403* (2013.01); *B60W 2552/53* (2020.02)

(58) Field of Classification Search
CPC ........... B60W 30/12; B60W 2420/403; B60W 2552/53; G06V 10/60; G06V 20/588
See application file for complete search history.

(56) References Cited

U.S. PATENT DOCUMENTS

| | | | |
|---|---|---|---|
| 2019/0163993 A1* | 5/2019 | Koo | ...................... G06V 20/588 |
| 2023/0150499 A1* | 5/2023 | Choi | ...................... G06V 20/56 |
| | | | 701/93 |
| 2024/0383402 A1* | 11/2024 | Yoon | ...................... B60Q 9/008 |
| 2024/0383474 A1* | 11/2024 | Yoon | ................... G06V 20/588 |

* cited by examiner

*Primary Examiner* — Sizo B Vilakazi
(74) *Attorney, Agent, or Firm* — Studebaker Brackett PLLC

(57) ABSTRACT

Provided are a lane keeping assist method and device. The lane keeping assist method performed by a lane keeping assist device includes: determining whether there is a tunnel through information acquired by a traveling vehicle; recognizing a lighting and a lighting line through a front camera in the traveling vehicle; checking lane condition and lane visibility information; calculating a corrected lane based on the lane condition and lane visibility information; and performing central control of the traveling vehicle based on the corrected lane.

18 Claims, 5 Drawing Sheets

VEHICLE LANE KEEPING ASSIST METHOD AND DEVICE

CROSS-REFERENCE TO RELATED APPLICATIONS

This application claims benefit of priority to Korean Patent Application No. 10-2024-0045221 filed Apr. 3, 2024, the entire content of which is incorporated herein by reference.

TECHNICAL FIELD

The present disclosure relates to a traveling vehicle lane keeping assist method and device based on a lighting line using lane condition and visibility information, and more particularly, to a method of assisting lane keeping of a traveling vehicle by utilizing a lighting line within a tunnel in a case in which a lane is unclear or visibility is blurred when the traveling vehicle enters the tunnel and travels.

BACKGROUND

Technology that assists traveling vehicles in keeping their driving lanes is one of the autonomous driving technologies and is considered a key to autonomous driving of vehicles. Therefore, in autonomous driving, technology to assist a traveling vehicle in keeping its lane when the traveling vehicle is in a specific situation has been discussed and development of the technology has been conducted in various directions.

SUMMARY

The present disclosure provides a method and apparatus for controlling a driving center of a traveling vehicle using a lighting line when a lane condition is poor within a tunnel.

The present disclosure also provides a method and apparatus for controlling driving of a vehicle using a lighting line when tunnel vision is not secured.

In an aspect, a lane keeping assist method performed by a lane keeping assist device includes: determining whether there is a tunnel through information acquired by a traveling vehicle; recognizing a lighting and a lighting line through a front camera in the traveling vehicle; checking lane condition and lane visibility information; calculating a corrected lane based on the lane condition and lane visibility information; and performing central control of the traveling vehicle based on the corrected lane.

The calculating of the corrected lane based on the lane condition and lane visibility information may include determining whether a lane condition is poor from the lane condition information.

The calculating of the corrected lane based on the lane condition and lane visibility information may further include setting the lighting line to the corrected lane when it is determined that the lane condition is poor.

The corrected lane may be calculated through any one of an offset, a heading angle, a curvature, and curvature change information of the lighting line within the tunnel.

Information on the lighting line may be calculated through line information received through the lighting line from a nearest lighting to a farthest lighting.

The calculating of the corrected lane based on the lane condition and lane visibility information may further include determining whether lane visibility is secured from the lane visibility information.

The calculating of the corrected lane based on the lane condition and lane visibility information may further include setting the lighting line to the corrected lane when it is determined that lane visibility is not secured.

The corrected lane may be calculated through any one of an offset, a heading angle, a curvature, and curvature change information of the lighting line within the tunnel.

Advantageous Effects

According to the present disclosure described above, the method and apparatus for controlling a driving center of a traveling vehicle using a lighting line when a lane condition is poor within a tunnel may be provided.

In addition, according to the present disclosure, the method and apparatus for controlling driving of a vehicle using a lighting line when tunnel vision is not secured may be provided.

DETAILED DESCRIPTION

Figure 1:
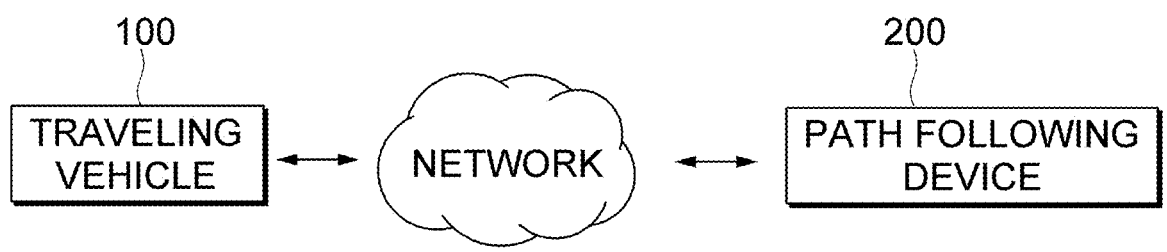
FIG. 1 illustrates an example environment in which a vehicle lane keeping assist device according to some embodiments of the present disclosure may be applied.

Hereinafter, embodiments are described in detail with reference to the accompanying drawings. Advantages and features of the present disclosure and methods of accomplishing the same will be apparent by referring to embodiments described below in detail in connection with the accompanying drawings. However, the present disclosure is not limited to the embodiments disclosed below and may be implemented in various different forms. The embodiments are provided only for completing the disclosure of the present disclosure and for fully representing the scope of the present disclosure to those skilled in the art.

In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present disclosure.

Unless otherwise defined, all terms (including technical and scientific terms) used herein have the same meaning as commonly understood by one of ordinary skill in the art to which the invention belongs. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. The terminology used herein is for the purpose of describing particular embodiments only and is not intended to be limiting of embodiments. As used herein, the singular forms "a", "an", and "the" are intended to include the plural forms as well, unless the context clearly indicates otherwise.

In describing the elements of the present disclosure, terms, such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it may be directly on or directly connected to the other element or layer, or intervening elements or layers may be present. Also, it should be understood that when one element is disposed on or under another element, this may denote a case in which the elements are disposed to directly contact each other, but may denote that the elements are disposed without directly contacting each other The word "comprise" and variations, such as "comprises" or "comprising," will be understood to imply the inclusion of stated constituents, operations, operations and/or elements but not the exclusion of any other constituents, operations, operations and/or elements.

Hereinafter, various embodiments of the present disclosure are described in detail with reference to the accompanying drawings.

In describing the elements of the present disclosure, terms, such as first, second, A, B, (a), (b), etc., may be used. Such terms are used for merely discriminating the corresponding elements from other elements and the corresponding elements are not limited in their essence, sequence, or precedence by the terms. Throughout the specification, unless explicitly described to the contrary, the word "comprise" and variations, such as "comprises" or "comprising", will be understood to imply the inclusion of stated elements but not the exclusion of any other elements. Further, in the present disclosure, a 'module' or a 'unit' performs at least one function or operation and may be implemented by hardware or software or a combination of the hardware and the software.

FIG. 1 illustrates an environment in which a vehicle lane keeping assist device according to some embodiments of the present disclosure may be applied. Through a system including a traveling vehicle 100 and a vehicle lane keeping assist device 200 illustrated in FIG. 1, central control may be performed using a lighting line, while the traveling vehicle is traveling in a tunnel.

In addition, although the present disclosure is described as a path-following device in FIG. 1, it should be noted that the path-following device may be used interchangeably with the vehicle lane keeping assist device in the same sense.

Hereinafter, the operations of the components illustrated in FIG. 1 related to the operation of following a path of the traveling vehicle 100 through the aforementioned system are described in more detail.

FIG. 1 illustrates an example in which the traveling vehicle 100 and the vehicle lane keeping assist device 200 are connected through a network, but this is only for convenience of understanding, and the number of devices that may be connected to the network may vary.

Meanwhile, FIG. 1 only illustrates an embodiment for achieving the purpose of the present disclosure, and some components may be added or deleted as needed. Hereinafter, the components illustrated in FIG. 1 are described in detail.

The vehicle lane keeping assist device 200 may collect and analyze various information generated by the traveling vehicle 100. The various information may include all data generated by the traveling vehicle 100, and may be, for example, a speed of the traveling vehicle, a wheel angle of the steering device, the specifications of the traveling vehicle itself, etc. and may further be information on an environment in which the traveling vehicle travels. Such information may be information collected using a series of devices within the traveling vehicle 100 while the traveling vehicle 100 is traveling, and the series of devices may include all electronic devices of the traveling vehicle 100 from the perspective of a technician with ordinary knowledge. In addition, such information may include information collected when the vehicle is stopped rather than driven.

The traveling vehicle 100 illustrated in FIG. 1 may include not only a vehicle equipped with autonomous driving technology, but also a general vehicle that is not equipped with autonomous driving technology. The traveling vehicle 100 may include both a four-wheeled vehicle and a two-wheeled motorcycle.

In order to avoid redundant description, various operations performed by the vehicle lane keeping assist device 200 are described in more detail below with reference to FIG. 2 and subsequent drawings.

Meanwhile, the vehicle lane keeping assist device 200 may be implemented with one or more computing devices. For example, all functions of the vehicle lane keeping assist device 200 may be implemented in a single computing device. As another example, a first function of the vehicle lane keeping assist device 200 may be implemented in a first computing device, and a second function thereof may be implemented in a second computing device. Here, the computing device may be a laptop, a desktop, etc., but is not limited thereto and may include all types of devices equipped with a computing function. However, it may be desirable for the vehicle lane keeping assist device 200 to be implemented as a high-performance server-class computing device. An example of a computing device is described with reference to FIG. 6.

In addition, functions that may be implemented in the vehicle lane keeping assist device 200 may also be implemented using electronic devices mounted on the traveling vehicle 100. Therefore, in FIG. 1, the vehicle lane keeping assist device 200 and the traveling vehicle 100 are illustrated separately. However, according to an embodiment, the vehicle lane keeping assist device 200 is mounted on the traveling vehicle 100 and corresponding devices may implement the first function, the second function, etc. Therefore, it should be noted that the present disclosure is not interpreted to be limited to the embodiment in which the traveling vehicle 100 and the vehicle lane keeping assist device 200 are externally separated as illustrated in FIG. 1.

In this specification, for convenience of description, a situation in which the traveling vehicle 100 and the vehicle lane keeping assist device 200 are separated to implement functions is described.

In some embodiments, components included in the environment in which the vehicle lane keeping assist device 200 is applied may communicate over a network. The network may be implemented as all types of wired/wireless networks, such as local area network (LAN), wide area network (WAN), mobile radio communication network, wireless broadband Internet (Wibro), etc.

Meanwhile, the environment illustrated in FIG. 1 illustrates that the traveling vehicle 100 and the vehicle lane keeping assist device 200 are connected through a network, but the scope of the present disclosure is not limited thereto, and the traveling vehicle 100 may be connected to the vehicle lane keeping assist device 200 through peer to peer (P2P).

The exemplary environment in which the corresponding device 200 according to some embodiments of the present disclosure may be applied has been described with reference to FIG. 1. Hereinafter, methods according to various embodiments of the present disclosure are described in detail with reference to FIG. 2 and the subsequent drawings.

Each operation of the methods to be described below may be performed by a computing device. In other words, each operation of the methods may be implemented as one or more instructions executed by a processor of the computing device. All operations included in these methods may be performed by a single physical computing device; however, first operations of the method may be performed by a first computing device and second operations of the method may be performed by a second computing device.

Hereinafter, in FIG. 2, it is assumed that each operation of the methods is performed by the vehicle lane keeping assist device 200 illustrated in FIG. 1. However, for convenience of description, the description of an operating subject of each operation included in the methods may be omitted.

Figure 2:
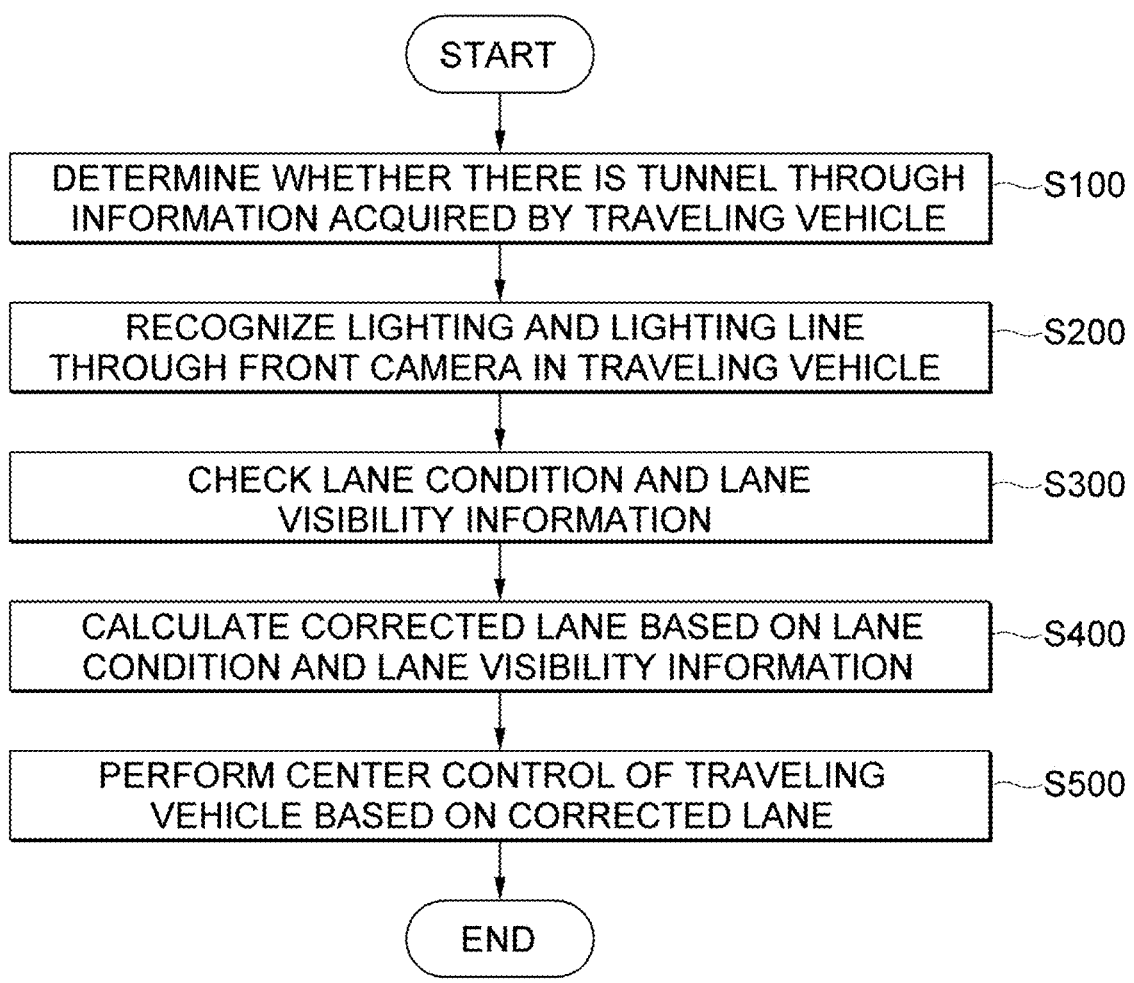
FIG. 2 is a flowchart of an operation of controlling the center of a traveling vehicle by calculating a corrected lane for the traveling vehicle that may be performed by a vehicle lane keeping assist device according to some embodiments of the present disclosure.

FIG. 2 is a flowchart of an operation of controlling the center of a traveling vehicle by calculating a corrected lane for the traveling vehicle that may be performed in a vehicle lane keeping assist device according to some embodiments of the present disclosure.

In operation S100, the vehicle lane keeping assist device 200 may determine whether there is a tunnel through information acquired by the traveling vehicle 100. The vehicle lane keeping assist device 200 may determine whether the vehicle 100 has entered a tunnel during current driving through a navigation or illumination sensor embedded in the traveling vehicle 100. Here, the vehicle lane keeping assist device 200 may determine whether the traveling vehicle has entered a tunnel from data acquired through the illuminance sensor at a time point at which illuminance data changes rapidly, and when navigation information confirms tunnel entry, the vehicle lane keeping assist device 200 may determine that the traveling vehicle 100 has entered the tunnel.

In operation S200, the vehicle lane keeping assist device 200 may recognize a lighting and a lighting line through a front camera in the traveling vehicle 100. That is, in operation S100, when the vehicle lane keeping assist device 200 determines that the traveling vehicle 100 has entered the tunnel, the vehicle lane keeping assist device 200 may recognize a lighting and a lighting line through the front camera mounted on the traveling vehicle 100. Here, the vehicle lane keeping assist device 200 may recognize a line connecting a lighting close to the front camera to a lighting distant from the front camera, as a lighting line.

In addition, the vehicle lane keeping assist device 200 uses the offset, which is a distance from the front camera to the lighting, as a reference point for maintaining the center of the lane, and a distance between the lane in which the vehicle 100 is traveling just before entering the tunnel and the closest lighting.

In operation S300, the vehicle lane keeping assist device 200 may check lane condition and lane visibility information. That is, after entering the tunnel, the vehicle lane keeping assist device 200 may check a lane condition based on a color of the road surface in the tunnel, a lane being erased, and the road surface being wet due to weather conditions. In addition, the vehicle lane keeping assist device 200 may check lane visibility information to determine whether lane visibility is disturbed depending on the degree of lane deterioration when the distance between a preceding vehicle and the traveling vehicle 100 is short. Hereinafter, a specific process is described in detail through FIGS. 3 and 4.

Figure 3:
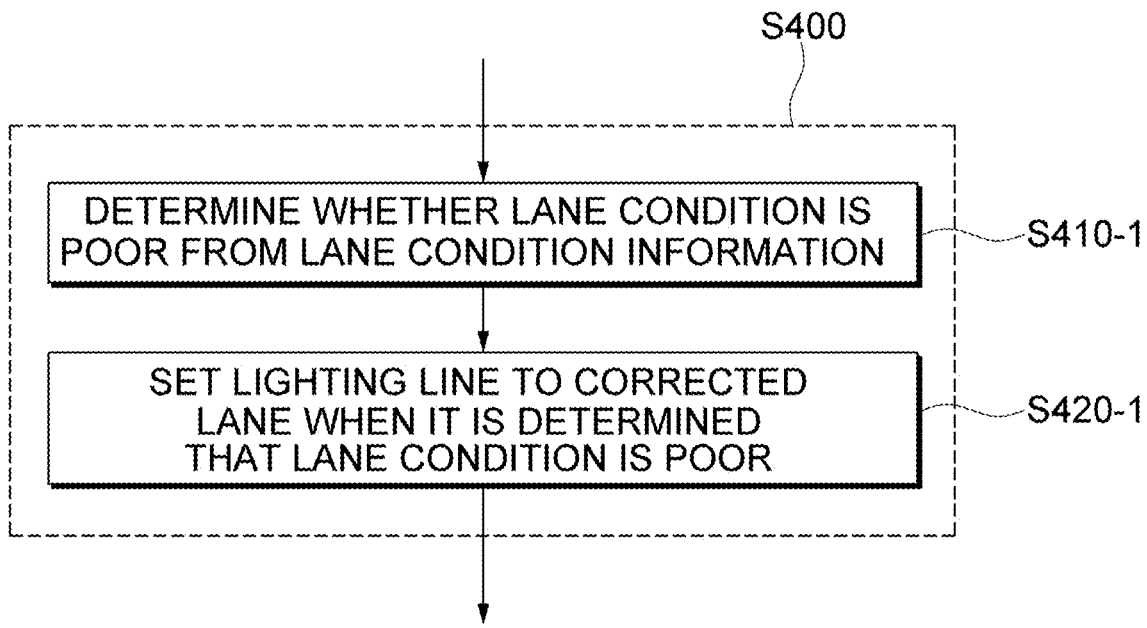
FIG. 3 is a flowchart specifically illustrating an example of calculating a corrected lane based on lane condition and lane visibility information according to some embodiments of the present disclosure.

FIG. 3 is a flowchart specifically illustrating an example of calculating a corrected lane based on lane condition and lane visibility information according to some embodiments of the present disclosure.

In operation S410-1, the vehicle lane keeping assist device 200 may determine whether the lane condition is poor from the lane condition information. After entering the tunnel, the vehicle lane keeping assist device 200 may check the color of the road surface in the tunnel, the lane being erased, and the lane condition due to the road surface being wet due to weather conditions. Here, if the vehicle lane keeping assist device 200 determines that the lane condition is poor in operation S420-1, the vehicle lane keeping assist device 200 may set the lighting line to the corrected lane. In this case, when a recognition rate for recognizing a lane in an electronic device mounted on the traveling vehicle 100 is lower than a preset threshold recognition rate, a case in which the road surface is set due to weather conditions, etc., the vehicle lane keeping assist device 200 may determine that the lane condition is poor.

Here, the lighting line may be calculated through any one of an offset, a heading angle, a curvature, and curvature change information, and the line connecting the closest lighting and the farthest lighting when the traveling vehicle 100 enters the tunnel may be set as a lighting line, and the lighting line may be set as a corrected lane.

Figure 4:
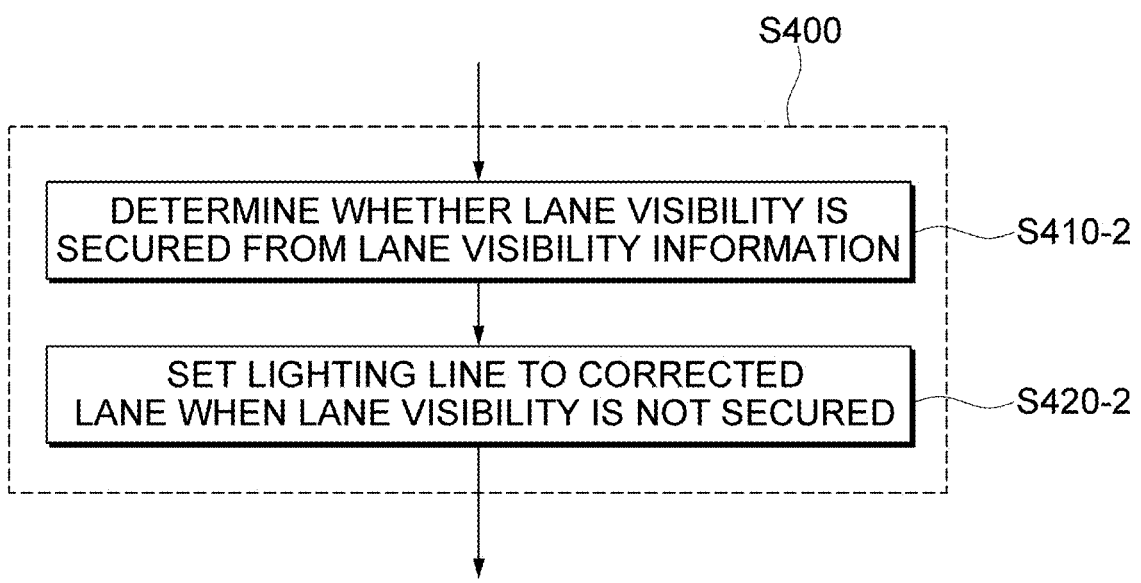
FIG. 4 is a flowchart specifically illustrating another example of calculating a corrected lane based on lane condition and lane visibility information according to some embodiments of the present disclosure.

According to another embodiment, FIG. 4 is a flowchart specifically illustrating another example of calculating a corrected lane based on lane condition and lane visibility information according to some embodiments of the present disclosure.

In operation S410-2, the vehicle lane keeping assist device 200 may determine whether lane visibility is secured from lane visibility information. The vehicle lane keeping assist device 200 may check lane visibility information, and when the distance between the preceding vehicle and the traveling vehicle 100 is close, the vehicle lane keeping assist device 200 may determine whether lane visibility is disturbed depending on the degree of lane deterioration.

In operation S420-2, the vehicle lane keeping assist device 200 may set a lighting line to the corrected lane when lane visibility is not secured. Here, when the distance between the traveling vehicle 100 and the preceding vehicle is shorter than a critical distance and when there is a rapid change in the lane recognition information but there is no rapid change in the lighting line, the vehicle lane keeping assist device 200 may determine that lane visibility is not secured.

Here, the lighting line may be calculated through any one of an offset, a heading angle, a curvature, and curvature change information, and the line connecting the closest lighting and the farthest lighting when the traveling vehicle 100 enters the tunnel may be set to the lighting line, and the lighting line may be set to a corrected lane.

Referring back to FIG. 2, in operation S400, the vehicle lane keeping assist device 200 may calculate a corrected lane based on lane condition and lane visibility information. The calculated corrected lane may be provided to the traveling vehicle 100, and the traveling vehicle 100 may provide the calculated corrected lane to the driver through an electronic device or display device mounted on the traveling vehicle 100.

In operation S500, the vehicle lane keeping assist device 200 may perform central control of the traveling vehicle 100 based on the corrected lane. The vehicle lane keeping assist device 200 may control the traveling vehicle to travel in the exact center of the corrected lane based on the calculated corrected lane by using an electronic device mounted on the traveling vehicle 100.

Figure 5A:
FIGS. 5A-5B are diagrams illustrating a process of calculating a corrected lane based on lane condition and lane visibility information that may be performed by a vehicle lane keeping assist device according to some embodiments of the present disclosure.
Figure 5B:

FIGS. 5A-5B are diagrams illustrating a process of calculating a corrected lane based on lane condition and lane visibility information that may be performed by a vehicle lane keeping assist device according to some embodiments of the present disclosure.

Referring to FIGS. 5A-5B, it may be assumed that the vehicle 100 equipped with the vehicle lane keeping assist device 200 is traveling within a tunnel. Here, the vehicle lane keeping assist device 200 may control a path of the vehicle 100 so that the vehicle may travel in the exact center of the lane.

When the traveling vehicle 100 is traveling, if a lane condition is not poor and lane visibility is secured, the traveling vehicle 100 may travel without controlling the path through the lighting line. However, in FIG. 5A, when the lane condition is insufficient due to the driving of a preceding vehicle of the traveling vehicle 100, the vehicle lane keeping assist device 200 may calculate the lighting line as a corrected lane and perform exact center control of the traveling vehicle 100 based on the corrected lane.

In addition, as illustrated in FIG. 5B, when the lane visibility of the traveling vehicle 100 is not secured due to rain or fog and the lane condition is recognized as being poor, the vehicle lane keeping assist device 200 may calculate the lighting line as a corrected lane by utilizing the lighting line and perform exact center control of the traveling vehicle 100 based thereon so that the traveling vehicle 100 may travel.

Therefore, in the present disclosure, after determining whether the lane condition and visibility of the traveling vehicle 100 are secured, if it is determined that it is easy to control the traveling vehicle 100 through the lighting line, the vehicle lane keeping assist device 200 may perform lane exact center control and safe traveling of the traveling vehicle 100 more actively by utilizing the lighting lane.

Hereinafter, an exemplary computing device in which a vehicle lane keeping assist device may be implemented is described in detail using FIG. 6.

Figure 6:
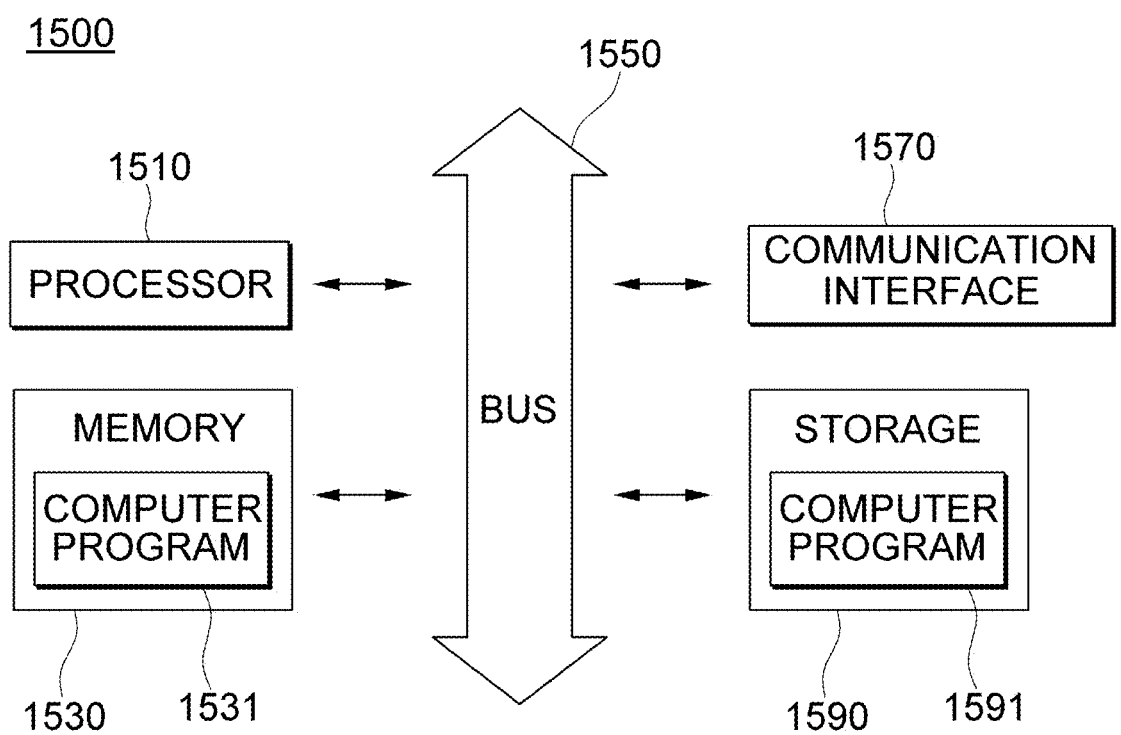
FIG. 6 is a diagram illustrating a computing device that may implement devices and/or systems according to various embodiments of the present disclosure.

FIG. 6 is a diagram illustrating a computing device that may implement devices and/or systems according to various embodiments of the present disclosure.

A computing device 1500 includes one or more processors 1510, a bus 1550, a communication interface 1570, a memory 1530 that loads a computer program 1531 executed by the processor 1510, and a storage 1590 that stores a computer program 1591. However, only components related to the embodiment of the present disclosure are illustrated in FIG. 6. Accordingly, a person skilled in the art to which this disclosure pertains may recognize that general-purpose components other than those illustrated in FIG. 6 may be further included.

The processor 1510 controls the overall operation of each component of the computing device 1500. The processor 1510 may include a central processing unit (CPU), a microprocessor unit (MPU), a micro controller unit (MCU), a graphics processing unit (GPU), or any type of processor well known in the art of the present disclosure. In addition, the processor 1510 may perform an operation on at least one application or program to execute a method according to embodiments of the present disclosure. The computing device 1500 may include one or more processors.

The memory 1530 stores various data, commands, and/or information. The memory 1530 may load one or more programs 1591 from the storage 1590 to execute methods according to embodiments of the present disclosure. The memory 1530 may be implemented as a volatile memory, such as RAM, but the technical scope of the present disclosure is not limited thereto.

The bus 1550 provides communication functionality between components of computing device 1500. The bus 1550 may be implemented as various types of buses, such as an address bus, a data bus, and a control bus.

The communication interface 1570 supports wired and wireless Internet communication of the computing device 1500. In addition, the communication interface 1570 may support various communication methods other than Internet communication. To this end, the communication interface 1570 may be configured to include a communication module well known in the art of the present disclosure.

According to some embodiments, the communication interface 1570 may be omitted.

The storage 1590 may non-temporarily store the one or more programs 1591 and various data.

The storage 1590 may be a non-volatile memory, such as read-only memory (ROM), erasable programmable ROM (EPROM), electrically erasable programmable ROM (EEPROM), or flash memory, a hard disk, a removable disk, or any type of computer-readable recording medium well known in the art to which the present disclosure pertains.

The computer program 1531, when loaded into the memory 1530, may include one or more instructions that cause the processor 1510 to perform methods/operations according to various embodiments of the present disclosure. That is, the processor 1510 may perform methods/operations according to various embodiments of the present disclosure by executing the one or more instructions.

So far, various embodiments of the present disclosure and effects according to the embodiments have been described with reference to FIGS. 1 to 6. The effects according to the technical idea of the present disclosure are not limited to the effects mentioned above, and other effects not mentioned may be clearly understood by those skilled in the art from the description in the specification.

The technical idea of the present disclosure described so far with reference to FIGS. 1 to 6 may be implemented as computer-readable code on a computer-readable medium. The computer-readable recording medium may be, for example, a removable recording medium (CD, DVD, Blu-ray disk, USB storage device, removable hard disk) or a fixed recording medium (ROM, RAM, computer-equipped hard disk). The computer program recorded on the computer-readable recording medium may be transmitted to another computing device through a network, such as the Internet, and installed on the other computing device, and thus may be used on the other computing device.

In the description above, although the components of the aspects of the present disclosure have been explained as assembled or operatively connected as a unit, the present disclosure is not intended to limit itself to, such aspects. Rather, within the objective scope of the claimed invention, the respective components may be selectively and operatively combined in any numbers.

While operations are depicted in the drawings in a particular order, this should not be understood as requiring that such operations be performed in the particular order illustrated or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems may generally be integrated together in a single software product or packaged into multiple software products.

Although the embodiments of the present disclosure have been described above with reference to the drawings, it will be understood by those skilled in the art of the present disclosure.

What is claimed is:

1. A lane keeping assist method performed by a lane keeping assist device, the lane keeping assist method comprising:
    determining whether there is a tunnel through information acquired by a traveling vehicle;
    recognizing a lighting and a lighting line through a front camera in the traveling vehicle;
    checking lane condition and lane visibility information;
    calculating a corrected lane based on the lane condition and lane visibility information; and
    performing central control of the traveling vehicle based on the corrected lane.

2. The lane keeping assist method of claim 1, wherein the calculating of the corrected lane based on the lane condition and lane visibility information includes determining whether a lane condition is poor from the lane condition information.

3. The lane keeping assist method of claim 2, wherein the calculating of the corrected lane based on the lane condition and lane visibility information further includes setting the lighting line to the corrected lane when it is determined that the lane condition is poor.

4. The lane keeping assist method of claim 3, wherein the corrected lane is calculated through any one of an offset, a heading angle, a curvature, and curvature change information of the lighting line within the tunnel.

5. The lane keeping assist method of claim 4, wherein information on the lighting line is calculated through line information received through the lighting line from a nearest lighting to a farthest lighting.

6. The lane keeping assist method of claim 1, wherein the calculating of the corrected lane based on the lane condition and lane visibility information further includes determining whether lane visibility is secured from the lane visibility information.

7. The lane keeping assist method of claim 6, wherein the calculating of the corrected lane based on the lane condition and lane visibility information further includes setting the lighting line to the corrected lane when it is determined that lane visibility is not secured.

8. The lane keeping assist method of claim 7, wherein the corrected lane is calculated through any one of an offset, a heading angle, a curvature, and curvature change information of the lighting line within the tunnel.

9. The lane keeping assist method of claim 8, wherein information on the lighting line is calculated through line information received through the lighting line from a nearest lighting to a farthest lighting.

10. A lane keeping assist device comprising:
    a processor;
    a network interface;
    a memory; and
    a computer program loaded into the memory and executed by the processor,
    wherein the processor performs
    an instruction determining whether there is a tunnel through information acquired by a traveling vehicle;
    an instruction of recognizing a lighting and a lighting line through a front camera in the traveling vehicle;
    an instruction of checking lane condition and lane visibility information;
    an instruction of calculating a corrected lane based on the lane condition and lane visibility information; and
    an instruction of performing central control of the traveling vehicle based on the corrected lane.

11. The lane keeping assist device of claim 10, wherein the instruction of calculating of the corrected lane based on the lane condition and lane visibility information includes an instruction of determining whether a lane condition is poor from the lane condition information.

12. The lane keeping assist device of claim 11, wherein the instruction of calculating of the corrected lane based on the lane condition and lane visibility information further includes an instruction of setting the lighting line to the corrected lane when it is determined that the lane condition is poor.

13. The lane keeping assist device of claim 12, wherein the corrected lane is calculated through any one of an offset, a heading angle, a curvature, and curvature change information of the lighting line within the tunnel.

14. The lane keeping assist device of claim 13, wherein information on the lighting line is calculated through line information received through the lighting line from a nearest lighting to a farthest lighting.

15. The lane keeping assist device of claim 10, wherein the instruction of calculating of the corrected lane based on the lane condition and lane visibility information further includes an instruction of determining whether lane visibility is secured from the lane visibility information.

16. The lane keeping assist device of claim 15, wherein the instruction of calculating of the corrected lane based on the lane condition and lane visibility information further includes an instruction of setting the lighting line to the corrected lane when it is determined that lane visibility is not secured.

17. The lane keeping assist device of claim 16, wherein the corrected lane is calculated through any one of an offset, a heading angle, a curvature, and curvature change information of the lighting line within the tunnel.

18. The lane keeping assist device of claim 17, wherein information on the lighting line is calculated through line information received through the lighting line from a nearest lighting to a farthest lighting.

* * * * *